(12) United States Patent
Arakawa et al.

(10) Patent No.: US 6,476,098 B1
(45) Date of Patent: Nov. 5, 2002

(54) ORGANIC-INORGANIC COMPOSITE MATERIAL AND PROCESS FOR PREPARING THE SAME

(75) Inventors: Motoomi Arakawa, Osaka (JP); Kazuaki Sukata, Yawata (JP); Yasuyuki Agari, Osaka (JP); Masayuki Shimada, Sakai (JP)

(73) Assignees: Orient Chemical Industries, Ltd., Osaka (JP); Osaka Municipal Government, Osaka (JP)

( * ) Notice: Subject to any disclaimer, the term of this patent is extended or adjusted under 35 U.S.C. 154(b) by 0 days.

(21) Appl. No.: 09/572,497

(22) Filed: May 18, 2000

(30) Foreign Application Priority Data

May 18, 1999 (JP) .......................................... 11-137136

(51) Int. Cl.⁷ ............................. C08K 9/06; C08K 9/10
(52) U.S. Cl. ........................ 523/206; 523/204; 523/212
(58) Field of Search ............................... 525/439, 444, 525/446, 470, 464, 474; 523/206, 204, 212

(56) References Cited

U.S. PATENT DOCUMENTS

| | | | | |
|---|---|---|---|---|
| 3,891,594 A | * | 6/1975 | Taylor | 523/204 |
| 3,956,230 A | * | 5/1976 | Gaylord | 523/206 |
| 3,960,805 A | * | 6/1976 | Taylor | 523/204 |
| 4,093,600 A | * | 6/1978 | Fan | 428/41 |
| 4,478,963 A | * | 10/1984 | McGarry | 523/206 |
| 4,752,630 A | * | 6/1988 | Sterzel et al. | 523/307 |
| 4,950,710 A | * | 8/1990 | Roha | 524/786 |
| 5,096,942 A | * | 3/1992 | Long et al. | 523/212 |
| 5,175,027 A | * | 12/1992 | Holmes-Farley et al. | 427/387 |
| 5,182,143 A | * | 1/1993 | Holmes-Farley et al. | 427/409 |
| 5,384,365 A | * | 1/1995 | Hanada et al. | 525/105 |
| 5,391,600 A | * | 2/1995 | Umeda et al. | 525/146 |
| 5,540,652 A | * | 7/1996 | Callinan et al. | 428/290 |
| 5,540,981 A | * | 7/1996 | Gallagher et al. | 428/220 |
| 6,103,854 A | | 8/2000 | Arakawa et al. | |
| 6,136,891 A | * | 10/2000 | Chopin et al. | 523/204 |
| 6,172,138 B1 | * | 1/2001 | Materne et al. | 523/212 |

FOREIGN PATENT DOCUMENTS

| | | |
|---|---|---|
| EP | 0496109 A2 | 7/1992 |
| EP | 0 661 311 A2 | 7/1995 |
| EP | 0 918 061 A2 | 5/1999 |
| JP | 05086188 A | 4/1993 |
| JP | 08104710 A | 4/1996 |
| JP | 08104711 A | 4/1996 |
| JP | 11209596 | 8/1999 |
| JP | 11255883 | 9/1999 |

OTHER PUBLICATIONS

L. E. Nielsen, English Translation of Mechanical Properties of Polymers & Composites, p. 253, Line 1 to last line.
Surivet, F. et al, Macromolecules 1992, 25, pp. 4309–4320.
Chujo, Y. et al, Makromol. Chem., Macromol. Symp. 42/43, pp. 303–312 (1991).
Wen, J et al, Journal of Inorganic & Organometallic Polymers, vol. 5, No. 4, 1995, pp. 343–375.
Shojaie, S. S. et al, Appl. Polym. Sci., vol. 58, pp. 1263–1274, 1995.

* cited by examiner

*Primary Examiner*—Peter Szekely
(74) *Attorney, Agent, or Firm*—Birch, Stewart, Kolasch & Birch, LLP (57) ABSTRACT

According to the present invention, there is provided an organic-inorganic composite material which shows high mechanical strength and high water resistance, requires low cost for preparation, and is preferred to be used as a high performance and a high functional plastic material. The present invention provides an organic-inorganic composite material which comprises a matrix of an organic polymer (E), metal oxide particles (C) dispersed uniformly in the organic polymer (E), and a surface modifier for allowing the metal oxide particles (C) to disperse uniformly in the organic polymer (E), wherein the surface modifier is another organic polymer (A) which has a functional group formable of a covalent bond to a surface of the metal oxide particles (C).

8 Claims, 1 Drawing Sheet

ORGANIC-INORGANIC COMPOSITE MATERIAL AND PROCESS FOR PREPARING THE SAME

FIELD OF THE INVENTION

The present invention relates to an organic-inorganic composite material which is useful as a plastic material of various kinds, a resin additive and a coating material, and to a process for preparing the same.

BACKGROUND OF THE INVENTION

The conventional material such as metal, glass, wood, paper and the like, has recently been taken over a plastic material due to its molding ability, convenient productivity, lightness in weight, flexibility, excellent mechanical property, excellent electric property and the like. A plastic material is now widely applied to the architecture resources, mechanical parts, or structural parts of electric, or electronic goods, exterior parts or interior parts of an automobile, a vehicle, an aircraft, or a watercraft, and the like. A plastic material is employed for various purposes as such, and various types are available on the market.

A plastic material has been required for cost saving and performance improvement by the market, and the trial for investigation of an alloy of plural kinds of plastics, or a composite of plastics with the other materials, is widely conducted. For example, an organic-inorganic composite material has been investigated in order to improve mechanical performance, heat resistance, and dimensional stability of a plastic material. The organic-inorganic composite material is usually prepared by blending an inorganic material such as glass fiber, and carbon fiber with a plastic material. Mechanical strength, thermal toughness, and dimensional strength of a plastic material seem to be improved by incorporating an inorganic material in short period.

However, compatibility of a plastic material with an inorganic material is generally poor, and it is difficult to make the inorganic material to disperse finely in the plastic material. Thus, the particle size of the inorganic material dispersed in the plastic material is generally not less than the order of micrometer. The particle size exerts a strong influence on strength of the composite material, and the larger the particle size, the weaker the strength (Dynamic Property of Polymer and Composite Material, L. E. Nielsen, Page 253).

Therefore, there have been the limitation due to the particle size, in the case when strength of the conventional organic-inorganic composite material is intended to improve. In addition, microscopic interface strength between the plastic material and the inorganic material may become poor depending on the kind of the plastic material which is employed (e.g., ABS resin, polyamide 6-6, polycarbonate, polyacetal, full aromatic polyester, and the like), and the problems such as lowering of impact strength are raised.

On the other hand, investigation has been made for introducing inorganic element such as Si, Ti, Zr directly in a backbone of the plastic material to prepare an organic-inorganic hybrid polymer material, in order to improve surface hardness, gloss, soil resistance, hardness, heat resistance, weather resistance, and chemical resistance.

The particle size of dispersoid which is present in the organic-inorganic hybrid polymer material is in the order of submicron to not more than nanometer, and dispersoid per molecular unit is also possible. A process for preparing the organic-inorganic hybrid polymer material which is known to those skilled in the art is that an organic monomer or an organic polymer, and an inorganic frame containing compound such as alkylsiloxane are radically copolymerized, or that an inorganic functional group such as alkoxy silane is added to an organic polymer as a pendent group, and the organic polymer is then crosslinked.

Japanese Patent Kokai Publication No. 43679/1993, and 86188/1993 describe a process for preparing an organic-inorganic hybrid polymer material in which a vinyl polymer and a silicone compound having a silane group (Si—H group) are subjected to the hydrosilylation reaction, and then the resultant are crosslinked by the sol-gel method.

Japanese Patent Kokai Publication No. 104710/1996, and 104711/1996 describe the process for preparing an organic-inorganic hybrid polymer material in which a vinyl monomer is radically polymerized using an alkoxysilyl end capped azoic initiator, and the resulting alkoxysilyl end capped vinyl polymer is hydrolyzed and polycondensed.

There is described here polystyrene, polyvinyl chloride, an acrylic resin as the vinyl polymer. The vinyl polymers however are poor in heat resistance and mechanical strength, and are not suitable for employing as a high-performance plastic material, particularly as a structural material and a hard coating material.

Macromolecules, vol. 25, page 4309, 1992, discloses the process for preparing an organic-inorganic hybrid polymer material in which an alkoxysilyl group is linked to a main chain of a polyalkylene oxide polymer, and the resultant is hydrolyzed and polycondensed. As the main chain of the organic-inorganic composite material, Macromol. Chem. Macromol. Symp., vol. 42/43, page 303, 1991, discloses a polyoxazoline polymer, J. Inorg. Organomet. Polym., vol. 5, page 4, 1995, discloses a polyamine polymer, and J. Appl. Polym. Sci., vol. 58, page 1263, 1995, discloses a cellulose polymer.

However, the polymers described above as the main chain of the organic-inorganic composite material, are all hydrophilic. The hydrophilic polymers are hygroscopic, poor in water resistance, and are not suitable for employing as a plastic molded material, a sealing material, a coating raw material, a structural material, a hard coating material, and the like.

We have made a study and succeeded to investigate an organic-inorganic hybrid polymer material made of the engineering plastics which is excellent in heat resistance, mechanical strength, and water resistance, and involves a wide application range for industrial use (Japanese Patent Kokai Publication No. 209596/1999, and 255883/1999). This organic-inorganic hybrid polymer material actually shows, on the performance test, higher heat resistance, surface hardness, mechanical strength, and the like than the conventional engineering plastics, and it is confirmed as very useful material.

The organic-inorganic hybrid polymer material shows improved performance over the commercially available polymer material. However, the rather high cost is required for preparing the organic-inorganic hybrid material, and it involves a problem of impractical for use in general purpose.

SUMMARY OF THE INVENTION

According to the present invention, there is provided an organic-inorganic composite material which shows high mechanical strength and high water resistance, requires low cost for preparation, and is preferred to be used as a high performance and a high functional plastic material. The present invention also provides a simple and practical process for preparing the same.

The present invention provides an organic-inorganic composite material which comprises a matrix of an organic polymer (E), metal oxide particles (C) dispersed uniformly in the organic polymer (E), and a surface modifier for allowing the metal oxide particles (C) to disperse uniformly in the organic polymer (E), wherein the surface modifier is another organic polymer (A) which has a functional group formable of a covalent bond to a surface of the metal oxide particles (C).

The organic-inorganic hybrid material of the present invention preferably be prepared by the process comprising the steps of:

(1) obtaining metal oxide particles coated with an organic polymer (A), in which the functional group of the organic polymer (A) is bonded covalently to a surface of the metal oxide particles;

(2) dispersing the metal oxide particles coated with the first organic polymer (A) finely and uniformly in another organic polymer (E); and (3) setting the resulting mixture.

DETAILED DESCRIPTION OF THE INVENTION

One preferred aspect of the present invention is as follows: Metal alkoxide compound (B) and an organic polymer (A) which has at least one functional group reactable with the metal alkoxide compound (B) are dissolved in an organic solvent. The solution is then subjected to the hydrolysis and the polycondensation reaction according to the sol-gel process, thereby the metal alkoxide compound (B) is self-polycondensed to form metal oxide particles (C), and concurrently the functional group of the organic polymer (A) is bonded covalently to a surface of the metal oxide particles (C) and the surface of the metal oxide particles (C) is coated with the organic polymer (A) to form modified metal oxide particles (D). Another organic polymer (E) which makes up the matrix of the organic-inorganic composite material, is added to the resulting dispersion. The mixture is well-mixed until the modified metal oxide particles (D) are dispersed finely and uniformly, and was set to obtain an organic-inorganic composite material (F).

The other preferred aspect of the present invention is as follows: Metal alkoxide compound (B) and an organic polymer (A) which has at least one functional group reactable with the metal alkoxide compound (B) are introduced in a mixer such as the Brabender. The mixture is then heated with mixing, thereby the metal alkoxide compound (B) is self-polycondensed to form metal oxide particles (C), and concurrently the functional group of the organic polymer (A) is bonded covalently to a surface of the metal oxide particles (C) and the surface of the metal oxide particles (C) is coated with the organic polymer (A) to obtain modified metal oxide particles (D). Another organic polymer (E) which makes up the matrix of the organic-inorganic composite material, is added to the mixer. The mixture is well-mixed with heating until the modified metal oxide particles (D) are dispersed finely and uniformly, and was set to obtain an organic-inorganic composite material (F).

The other preferred aspect of the present invention is as follows: Metal oxide particles (C) and an organic polymer (A) which has at least one functional group bondable covalently to a surface of the metal oxide particles (C) are mixed in an organic solvent. The mixture is then subjected to the hydrolysis reaction according to the sol-gel process, thereby the functional group of the first organic polymer (A) is bonded covalently to a surface of the metal oxide particles (C) and the surface of the metal oxide particles (C) is coated with the organic polymer (A) to obtain modified metal oxide particles (D). Another organic polymer (E) which makes up the matrix of the organic-inorganic composite material, is added to the resulting dispersion. The mixture is well-mixed until the modified metal oxide particles (D) are dispersed finely and uniformly, and was set to obtain an organic-inorganic composite material (F).

The other preferred aspect of the present invention is as follows: Metal oxide particles (C) and an organic polymer (A) which has at least one functional group bondable covalently to a surface of the metal oxide particles (C) are introduced in a mixer such as the Brabender. The mixture is then heated with mixing, thereby the functional group of the first organic polymer (A) is bonded covalently to a surface of the metal oxide particles (C) and the surface of the metal oxide particles (C) is coated with the organic polymer (A) to obtain modified metal oxide particles (D). Another organic polymer (E) which makes up the matrix of the organic-inorganic composite material, is added to the mixer. The mixture is well-mixed with heating until the modified metal oxide particles (D) are dispersed finely and uniformly, and was set to obtain an organic-inorganic composite material (F).

Organic Polymer (A)

The organic polymer (A) employed in the present invention is the organic polymer which has at least one functional group in the molecule. The organic polymer (A) may be those prepared by any preparation process known to those skilled in the art.

It is preferred that the organic moiety of the organic polymer (A) has compatibility with the organic polymer (E), and the functional group has compatibility with the metal oxide particles (C).

Therefore, in the case when the organic polymer (E), the metal oxide particles (C), and the organic polymer (A) are combined, the organic polymer (A) shows compatibility with both the organic polymer (E) and the metal oxide particles (C), and serves as a surface modifier. In other words, the first organic polymer (A) makes the metal oxide particles (C) familiar with the organic polymer (E).

The organic polymer (A) preferably has a backbone which shows compatibility with the organic polymer (E). Examples of the backbone of the organic polymer (A) include a thermoplastic resin or a thermoplastic elastomer precursor such as polyethylene, polypropylene, vinyl chloride resin, polystyrene, methyl methacrylate resin, polyamide, polyacetal, polycarbonate, polyester, polyphenylene ether, polymethyl pentene, polysulfone, polyether sulfone, polyphthalamide, polyphenylene sulfide, polyarylate, polyimide, polyether imide, polyether ketone; and a thermocurable resin precursor such as phenol resin, epoxy resin, acrylic resin, melamine resin, alkyd resin, urea resin, silicone resin, and the like.

Preferred examples include the thermoplastic resin. The engineering plastics such as polyamide, polyacetal, polycarbonate, polysulfone, and polyarylate are specifically preferred due to their high performance.

The backbone of the organic polymer (A) may be composed of one kind of the above described polymers or precursors, or may be a copolymer backbone composed of the combination thereof. The backbone may be a mixture of some kinds of components, or may be the linear structure or the branched structure.

The molecular weight of the organic polymer (A) preferably is the range so that the organic polymer (A) shows sufficient compatibility with the organic polymer (E). The molecular weight is generally a number average molecular weight of 500 to 50000, preferably 1000 to 15000, more preferably 2000 to 8000.

The organic polymer (A) preferably has a functional group which shows compatibility with the metal oxide particle (C). It is preferred that the functional group is bondable covalently to a surface of the metal oxide particles. A surface of the metal oxide particles is polar in general, and a substantial amount of polar group such as hydroxyl group (—OH), a metal hydroxide group (-Metal-OH), and the like are present on the surface. Therefore, the functional group is preferably a polar group, and more preferably those reactable with the hydroxyl group, the metal hydroxide group, and the like.

In the case when the metal alkoxide compound (B) and the organic polymer (A) are subjected to the hydrolysis and the polycondensation reaction according to the sol-gel process in a solvent to form the modified metal oxide particles (D), to the surface of which the first polymer (A) is bonded covalently, the functional group of the organic polymer (A) is preferably reactable with a metal alkoxide group (-Metal-OR) of the metal alkoxide compound (B).

Examples of the functional group of the organic polymer (A) include a metal alkoxide group, a hydroxyl group, an amino group, a carboxyl group, and the like. Preferred is the metal alkoxide group.

The functional group equivalent of the organic polymer (A) is generally 1 to 100, preferably 1 to 50, more preferably 2 to 10. If the functional group equivalent of the organic polymer (A) is less than 1, the linkage to the metal oxide particles may become insufficient, and performance of the resulting material may become poor. If more than 100, the metal oxide particles may not be finely dispersed, the resulting material may become fragile. The functional groups present in one molecule of the organic polymer (A) may be one kind, or may be combination of more than one kind.

Metal Oxide Particles (C)

The metal oxide particles (C) employed in the present invention are those having a functional group which shows compatibility with the functional group of the organic polymer (A). The functional group of the metal oxide particles (C) is generally an active polar group such as a hydroxyl group, and a metal hydroxide group.

The metal oxide particles (C) may be those commercially available or those prepared by the hydrolysis and the polycondensation reaction of the metal alkoxide compound (B), so long as they have the active polar group on the surface. The metal oxide particles (C) which are prepared from the metal alkoxide compound (B) is preferred because they have a lot of hydroxyl groups and the like on the surface or the interior thereof. Examples of the metal element for the metal oxide particles (C) include Si, Ti, Zr, Fe, Cu, Sn, B, Al, Ge, Ce, Ta, W, and the like. These are the same elements as those employed for the metal alkoxide compound (B).

Specific examples of the metal particles include silicon oxide (silica) particles, titanium oxide (titania) particles, zirconium oxide (zirconia) particles, and the like. The shape or the crystal system of the metal particles is not particularly limited. The metal oxide particles (C) are more preferable, the smaller the particle size becomes. The particle size is generally not more than 1 $\mu$m, preferably not more than 0.1 $\mu$m, for example 0.001 to 0.05 $\mu$m, or 0.001 to 0.1 $\mu$m. The metal oxide particles (C) may be composed of one kind, or may be combination of more than one kind. The metal oxide may be those which contain more than one metal element in the molecule.

Organic Polymer (E)

The other organic polymer (E) is the component which makes up a matrix of the organic-inorganic composite material, and is employed in the largest quantity among the effective components. The structure of the organic polymer (E) is not particularly limited to, but have to be those which provide sufficient strength to the resulting organic-inorganic composite material for use as various plastic materials. The organic polymer (E) may be those prepared by any preparation process known to those skilled in the art.

It is sufficient that the organic polymer (E) shows compatibility with the backbone of the organic polymer (A) which is employed as a surface modifier, and it is not necessary that the structure of the organic polymer (E) is the same as that of the organic polymer (A). The organic polymer (E) is preferably a commercially available organic polymer when the cost is considered.

Examples of a backbone of the organic polymer (E) include a thermoplastic resin or a thermoplastic elastomer precursor such as polyethylene, polypropylene, vinyl chloride resin, polystyrene, methyl methacrylate resin, polyamide, polyacetal, polycarbonate, polyester, polyphenylene ether, polymethyl pentene, polysulfone, polyether sulfone, polyphthalamide, polyphenylene sulfide, polyarylate, polyimide, polyether imide, polyether ketone; and a thermocurable resin precursor such as phenol resin, epoxy resin, acrylic resin, melamine resin, alkyd resin, urea resin, silicone resin, and the like.

Preferred examples include the thermoplastic resin. The engineering plastics such as polyamide, polyacetal, polycarbonate, polysulfone, and polyarylate are specifically preferred due to their high performance.

The backbone of the first organic polymer (E) may be composed of one kind of the above described polymers or precursors, or may be a copolymer backbone composed of the combination thereof. The backbone may be a mixture of some kinds of components, or may be the linear structure or the branched structure.

The molecular weight of the organic polymer (E) have to be within the range so that sufficient strength is provided to the resulting organic-inorganic composite material for use as various plastic materials in the case when it makes up the matrix thereof. The molecular weight is generally a number average molecular weight of 500 to 100000, preferably 1000 to 50000, more preferably 10000 to 50000. A functional group may be present, or absent in the organic polymer (E).

Modified Metal Oxide Particles (D)

The modified metal oxide particles (D) have an internal structure of that the functional group of the organic polymer (A) is bonded covalently to a surface of the metal oxide particles (C). As a result, the surface of the metal oxide particles (C) is coated with the organic polymer (A). Thereby the metal oxide particles (C) are dispersed finely and uniformly in the organic polymer (E).

When the reaction ratio of the organic polymer (A), and the metal alkoxide compound (B) or the metal oxide particles (C), as well as the reaction condition are properly adjusted, the linkage by covalent bond between the organic polymer (A) and the metal oxide particles (C) is suitably formed. As a result, the metal oxide particles (C) may be fixed in the organic polymer (E), even though the both are usually incompatible.

By providing the modified metal oxide particles (D), it becomes possible that the metal oxide particles (C) are finely dispersed in the organic polymer (E) which makes up a matrix. The modified metal oxide particles (D) may be those prepared by any preparation process known to those skilled in the art.

One example of the process for preparing the modified metal oxide particles (D) is that the organic polymer (A) and the metal alkoxide compound (B) are dissolved in an organic solvent, and the solution is subjected to the hydrolysis and the polycondensation reaction according to the sol-gel process.

The metal alkoxide compound (B) employed in the present invention is not limited to, and any class of them may be used. Examples of metal alkoxide compound (B) preferably to be used in the present invention are those represented by the formula (1):

$$A_pM \quad (1)$$

wherein

A represents an alkoxy group having 1 to 8, preferably 1 to 4 carbon atoms;

M represents a metal element selected from the group consisting of Si, Ti, Zr, Fe, Cu, Sn, B, Al, Ge, Ce, Ta, and W, preferably the group consisting of Si, Ti, and Zr; and p represents an integer of 2 to 6.

Specific examples of metal alkoxide compound (B) include tetraalkoxysilanes such as tetramethoxysilane, tetraethoxysilane, tetraisopropoxysilane, and tetrabutoxysilane;

tetra-alkoxytitanes such as tetra-n-propoxytitane, tetra-iso-propoxytitane, and tetrabutoxytitane;

tetra-alkoxyzilconiums such as tetra-n-propoxyzirconium, tetra-iso-propoxyzirconium, and tetrabutoxyzirconium; and metal alkoxides such as dimethoxycopper, diethoxybarium, trimethoxyboron, triethoxygallium, tributoxyaluminium, tetraethoxygermanium, tetrabutoxylead, penta-n-propoxytantalum, and hexaethoxytungsten.

The other examples of metal alkoxide compound (B) are those represented by the formula (2):

$$R_kA_lM(R'_mX)_n \quad (2)$$

wherein

R represents a hydrogen atom, an alkyl group having 1 to 12, preferably 1 to 5 carbon atoms, or a phenyl group, A represents an alkoxy group having 1 to 8, preferably 1 to 4 carbon atoms, M represents a metal element selected from the group consisting of Si, Ti, Zr, Fe, Cu, Sn, B, Al, Ge, Ce, Ta, and W, preferably the group consisting of Si, Ti, and Zr, R' represents an alkylene group or an alkylidene group having 1 to 4, preferably 2 to 4 carbon atoms, X represents a functional group selected from the group consisting of an isocyanate group, an epoxy group, a carboxyl group, an acid halide group, an acid anhydride group, an amino group, a thiol group, a vinyl group, a methacryl group, and a halogen atom, and k represents an integer of 0 to 5, l represents an integer of 1 to 5, m represents 0 or 1, n represents an integer of 0 to 5.

Specific examples of metal alkoxide compound (B) of which metal is silicone, include (alkyl)alkoxysilanes such as trimethoxysilane, triethoxysilane, tri-n-propoxysilane, dimethoxysilane, diethoxysilane, di-iso-propoxysilane, monomethoxysilane, monoethoxysilane, monobutoxysilane, methyidimethoxysilane, ethyldiethoxysilane, dimethylmethoxysilane, di-iso-propylisopropoxysilane, methyltrimethoxysilane, ethyltriethoxysilane, n-propyltri-n-propoxysilane, butyltributoxysilane, dimethyldimethoxysilane, diethyldiethoxysilane, di-iso-propyldi-iso-propoxysilane, dibutyldibutoxysilane, trimethylmethoxysilane, triethylethoxysilane, tri-n-propyl-n-propoxysilane, tributylbutoxysilane, phenyltrimethoxysilane, diphenyidiethoxysilane, and triphenylmethoxysilane;

(alkyl)alkoxysilanes having an isocyanate group such as 3-isocyanatopropyltriethoxysilane, 2-isocyanato-ethyltri-n-propoxysilane, 3-isocyanatopropylmethyldimethoxysilane, 2-isocyanato-ethylethyldibutoxysilane, 3-isocyanatopropyidimethyl-iso-propoxysilane, 2-isocyanato-ethyidiethylbutoxysilane, di(3-isocyanatopropyl)diethoxysilane, di(3-isocyanatopropyl)methylethoxysilane, and ethoxysilane tri-isocyanate;

(alkyl)alkoxysilanes having an epoxy group such as 3-glycidoxypropyltriethoxysilane, 3-glycidoxypropylmethyidimethoxysilane, 3-glycidoxypropyldimethylethoxysilane, 2-(3,4-epoxycyclohexyl)ethyltrimethoxysilane, and 3,4-epoxybutyltrimethoxysilane;

(alkyl)alkoxysilanes having a carboxyl group such as carboxymethyltriethoxysilane, carboxymethylethyldiethoxysilane, and carboxyethyidimethylmethoxysilane;

alkoxysilanes having an acid anhydride group such as 3-(triethoxysilyl)-2-methylpropylsuccinic anhydride;

alkoxysilanes having a acid halide group such as 2-(4-chlorosulfonylphenyl)ethyltriethoxysilane;

(alkyl)alkoxysilanes having an amino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyidimethoxysilane, and N-phenyl-3-aminopropyltrimethoxysilane;

(alkyl)alkoxysilanes having a thiol group such as 3-mercaptopropyltrimethoxysilane, 2-mercaptoethyltriethoxysilane, and 3-mercaptopropylmethyldimethoxysilane;

(alkyl)alkoxysilanes having a vinyl group such as vinyltrimethoxysilane, vinyltriethoxysilane, and vinylmethyidiethoxysilane;

(alkyl)alkoxysilanes having a methacryl group such as 3-methacryloxypropyltrimethoxysilane, 3-methacryloxypropyltriethoxysilane, and 3-methacryloxypropylmethyidimethylsilane;

(alkyl)alkoxysilanes having a halogen atom such as triethoxyfluorosilane, 3-chloropropyltrimethoxysilane, 3-bromopropyltriethoxysilane, and 2-chloroethylmethyidimethoxysilane.

Substantially the same compounds as described above except that the metal element other than silicon, for example Ti, Zr, Fe, Cu, Sn, B, Al, Ge, Ce, Ta, or W is used, are also included in the scope of metal alkoxide compound (B) of the present invention.

The metal alkoxide compound (B) may be used alone or in combination of more than one kind. The metal alkoxide compound which includes more than one kind of metal per molecule such as $Mg[Al(iso-OC_3H_7)_4]_2$, $Ba[Zr_2(OC_2H_5)_9]_2$, $(C_3H_7O)_2Zr[Al(OC_3H_7)_4]_2$, or the oligomer type metal alkoxide compound which includes not less than two repeating unites in the molecule such as tetramethoxysilane oligomer, tetraethoxysilane oligomer are also employed. The alkoxy group of metal alkoxide compound (B) may be an acetoxy group, or an acetyl acetoxy group.

The hydrolysis and the polycondensation reaction by the sol-gel process means the reaction process in which a polymer having a metal alkoxide group is reacted with water, the metal alkoxide group is converted to a hydroxyl group, and the hydroxyl group is simultaneously polycondensed with an adjacent metal hydroxide group (e.g., —Si (OH)$_3$) or an adjacent alkoxymetal group by dehydration or dealcoholation to form three-dimensional crosslinkage composed of inorganic covalent bond. The polycondensation by dehydration likely to occur between two metal hydroxide groups, but in addition, occurs with a functional group having active hydrogen such as another hydroxyl group, an amino group, and a carboxyl group.

Water employed for the hydrolysis may be added to the reaction process in an amount sufficient for converting all of the alkoxy group to the hydroxyl group. Otherwise, water present in the reaction mixture, or moisture of an atmosphere may be utilized. The reaction is preferably conducted at from room temperature to 100° C. for 0.5 to 24 hours. An acidic catalyst such as hydrochloric acid, sulfonic acid, acetic acid, benzenesulfonic acid, and p-toluenesulfonic acid, or a basic catalyst such as sodium hydroxide, potassium hydroxide, ammonia, triethylamine, piperidine, and 1,8-diazabicyclo[5,4,0]-7-undecen (DBU), may also be employed.

After the end of the reaction, the resulting material may further be heated at 50 to 400° C., for 5 minutes to 48 hours in order to surely proceed the polycondensation reaction and to form hard crosslinkage.

Examples of the solvent employed for the sol-gel reaction include a hydrocarbon solvent such as benzene, toluene, and n-hexane; a halogenated hydrocarbon solvent such as chloroform, dichloromethane, dichloroethane, and chlorobenzene; an ether solvent such as tetrahydrofuran, 1,4-dioxane, 1,3-dioxane, diethyl ether, and dibutyl ether; a ketone solvent such as acetone, methyl ethyl ketone, and cyclohexanone; an ester solvent such as ethyl acetate, and butyl acetate; an alcohol solvent such as methanol, ethanol, n-propanol, isopropanol, and mixture thereof, but is not limited to these examples. A polar solvent such as an alcohol solvent is usually employed.

The other example of the process for preparing the modified metal oxide particles (D) is that the organic polymer (A) and the metal alkoxide compound (B) are mixed with heating by a mixer such as the Brabender. It is preferred that the mixing temperature is adjusted to the molding, softening, or melting temperature of the organic polymer (A). The mixing temperature is preferably from 100 to 450° C., more preferably 150 to 300° C. The metal alkoxide groups present in the organic polymer (A) and the metal alkoxide compound (B) are allowed to react each other in the same manner as the sol-gel reaction, under the mixing temperature. Thereby inorganic covalent bond is formed, result in three-dimensional crosslinking. The mixing period is preferably about 1 to 60 minutes. An acidic catalyst or a basic catalyst may be employed likewise the sol-gel reaction.

The organic polymer (A) and the metal alkoxide compound (B) may be mixed and reacted at the same time as described above, however, it is also acceptable that one of the components is hydrolyzed by first, and the rest is then hydrolyzed. Preferably, the metal alkoxide compound (B) is hydrolyzed by first, the organic polymer (A) is added, and the mixture is further hydrolyzed.

The reaction by using a mixing machine may also be conducted as substantially the same manner. That is, a mixture of the organic polymer (A) and the metal alkoxide compound (B) may be subjected to the mixing and heating treatment, or it is acceptable that one of the components, preferably the metal alkoxide compound (B) is treated by first, the rest of the components is added, and then the resulting mixture is treated again.

The modified metal oxide particles (D) prepared by the precess described above has an internal structure of that the functional group of the organic polymer (A) is bonded covalently to a surface of the metal oxide particles (C).

The ratio by weight of the organic polymer (A) to the metal alkoxide compound (B) is 10/90 to 99/1, preferably 30/70 to 90/10, more preferably 50/50 to 90/10. If the amount of the organic polymer (A) is too small, linkage to the metal oxide particles (C) becomes poor, and performance of the resulting material may become poor. If the amount of the metal alkoxide compound (B) is too small, performance of the plastic material may not be improved.

Substantially the same process as described above may be conducted by using the metal oxide particles (C) instead of the metal alkoxide compound (B) to prepare the modified metal oxide particles (D). A hydroxyl group or a metal hydroxide group present on a surface of the metal oxide particles (C) is active, and it is easily subjected to the condensation reaction with the functional group of the organic polymer (A) by mixing with heating to form a covalent bond.

Organic-inorganic Composite Material (F)

The organic-inorganic composite material (F) of the present invention is prepared as follows: The modified metal oxide particles (D), to the surface of which the organic polymer (A) is bonded covalently, is prepared by the hydrolysis and the polycondensation reaction of the metal alkoxide compound (B) or the metal oxide particles (C) by using the organic polymer (A) as a surface modifier, as described above; and the resulting modified metal oxide particles (D) are then dispersed finely and uniformly in the other organic polymer (E).

The ratio by weight of the modified metal oxide particles (D) to the organic polymer (E) is not limited. However, the content of the organic polymer (E) is not less than 50% by weight, preferably not less than 70% by weight in view of the cost required for production. The content of the modified metal oxide particles (D) is not less than 5% by weight, preferably not less than 10% by weight in view of performance improvement of the plastic material. The ratio by weight may be for example 1/99 to 70/30, 5/95 to 50/50, and 10/90 to 30/70.

The ratio by weight of the total amount of the organic polymer (A) and the organic polymer (E) to the amount of the metal oxide particles (C) (or the metal alkoxide compound (B)) is preferably 99/1 to 30/70, more preferably 95/5 to 50/50.

Specific example of the process for preparing an organic-inorganic composite material (F) is as follows: A mixture of a metal alkoxide compound (B) and an organic polymer (A) which has at least one functional group reactable with the metal alkoxide compound is subjected to the hydrolysis and the polycondensation reaction according to the sol-gel process in a solvent, thereby modified metal oxide particles (D), to the surface of which the organic polymer (A) is bonded covalently, are provided. Another organic polymer (E) is then added to the solution, and the mixture is well-mixed to obtain the organic-inorganic composite material (F).

The other example is as follows: An organic polymer (A) is allowed to react with a metal alkoxide compound (B) by heating and mixing with a mixing machine such as the Brabender to prepare modified metal oxide particles (D). Another organic polymer (E) is then added to the mixing machine, and the mixture is well-mixed with heating to obtain the organic-inorganic composite material (F).

Substantially the same process as described above may be conducted by using the metal oxide particles (C) instead of the metal alkoxide compound (B) to prepare the organic-inorganic composite material (F).

In a process for preparing an organic-inorganic composite material (F), modified metal oxide particles (D) may be preliminary prepared from an organic polymer (A) and a metal alkoxide compound (B) or a metal oxide particles (C), and then the modified metal oxide particles (D) may be mixed with another organic polymer (E). Specific examples of the process for preparing an organic-inorganic composite material (F) are shown below.

[A] A process comprising the steps of:
(1) a metal alkoxide compound (B) and an organic polymer (A) which has at least one functional group reactable with the metal alkoxide compound (B) are dissolved in an organic solvent;
(2) an aqueous solution of an acidic or a basic catalyst is added to this, and the hydrolysis and the polycondensation reaction of the functional groups in the organic polymer (A) and in the metal alkoxide compound (B) is conducted to provide metal oxide particles (D) modified with the organic polymer (A);
(3) the modified metal oxide particles (D) are dispersed finely and uniformly in an organic solution of another organic polymer (E); and
(4) a solvent is removed by heating and drying.

[B] A process comprising the steps of:
(1) an aqueous solution of an acidic or a basic catalyst is added to an organic solution of a metal alkoxide compound (B), and the hydrolysis and the polycondensation reaction of the metal alkoxide compound (B) is conducted to provide metal oxide particles (C);
(2) the metal oxide particles (C) are mixed with an organic solution of an organic polymer (A) which has a functional group bondable covalently to a surface of the metal oxide particles (C);
(3) an aqueous solution of an acidic or a basic catalyst is added to this, and the hydrolysis and the polycondensation reaction of the functional groups on the surface of the metal oxide particles and in the first organic polymer is then conducted to provide metal oxide particles (D) modified with the organic polymer (A);
(4) the modified metal oxide particles (D) are dispersed finely and uniformly in an organic solution of another organic polymer (E); and
(5) a solvent is removed by heating and drying.

[C] A process comprising the steps of:
(1) a metal alkoxide compound (B) and an organic polymer (A) which has a functional group reactable with the metal alkoxide compound (B) are mixed with heating by using a heating mixer to provide metal oxide particles (D) modified with the organic polymer (A); and (2) another organic polymer (E) is then added to this, and the mixture is mixed with heating.

[D] A process comprising the steps of:
(1) Metal oxide particles (C) having a hydroxyl group (a metal hydroxide group) on the surface are provided;
(2) the metal oxide particles (C) are allowed to react with an organic polymer (A) which has a functional group reactable with the hydroxyl group (the metal hydroxide group) in an organic solvent to provide metal oxide particles (D) modified with the organic polymer (A);
(3) the modified metal oxide particles (D) are dispersed finely and uniformly in an organic solution of another organic polymer (E); and
(4) a solvent is removed by heating and drying.

[E] A process comprising the steps of:
(1) Metal oxide particles (C) having a hydroxyl group (a metal hydroxide group) on the surface are provided;
(2) the metal oxide particles (C) are allowed to react with an organic polymer (A) which has a functional group reactable with the hydroxyl group (the metal hydroxide group) in an organic solvent to provide metal oxide particles (D) modified with the organic polymer (A);
(3) the modified metal oxide particles (D) and another organic polymer (E) are mixed with heating, by using a heating mixer.

[F] A process comprising the steps of:
(1) Metal oxide particles (C) having a hydroxyl group (a metal hydroxide group) on the surface are provided;
(2) the metal oxide particles (C) are allowed to react with an organic polymer (A) which has a functional group reactable with the hydroxyl group (the metal hydroxide group) in an organic solvent to provide metal oxide particles (D) modified with the organic polymer (A);
(3) another organic polymer (E) is added to this, and was mixed and heated.

The organic-inorganic composite material prepared by the above described process is a material having high performance and high functionality, in which the metal oxide particles bonded covalently to an organic polymer, is dispersed finely and uniformly in another organic polymer.

A mixing machine such as the Brabender, and a shaping machine for general purpose such as injection molding and extrusion molding, may be employed on and after the step of preparing the modified metal oxide particles (D) in the process for preparing the organic-inorganic composite material of the present invention. Therefore, the process is simple and practical. The molded shape thereof may include coating, thread, film, sphere, block, and the like.

Throughout the process of the present invention, metal such as Si, Ti, Zr, Fe, Cu, Sn, B, Al, Ge, Ce, Ta, and W, metal oxide, metal complex, and inorganic salt, may be coexisted for adjusting the inorganic content or the closslinking density in order to improve or supply toughness, hardness, weather resistance, chemical resistance, flame resistance, static resistance to the resulting organic-inorganic composite material. Further, formamide, dimethylfolmamide, dioxane, and oxalic acid may be added as a dry-proof agent in order to prevent crack which may be formed at the process of gellation, drying, or heating; or acetyl acetone and the like may be added as an additive.

The characteristics of an inorganic material such as mechanical strength, heat resistance, weather resistance, surface hardness, stiffness, water resistance, chemical resistance, pollution resistance, flame resistance, and the like are conveniently supplied to an organic material in the organic-inorganic composite material of the present invention. In other words, the characteristics of an organic material such as impact resistance, plasticity, processability, and lightness in weight are conveniently supplied to an inorganic material.

As a result, an organic-inorganic composite material suitable for use as high functional plastic materials, plastic molding article or film, sealing material, adhesives, binder for coating, structural material, optical material, resin additives, surface modifier, hard-coating agent, electric or electronic material, medical material and filler material, is achieved by the present invention.

The present invention is illustrated by the following examples which, however, are not to be construed as limiting the present invention to their details.

EXAMPLES

Preparation Example 1

Polycarbonate diol having a number average molecular weight of 3900, and a hydroxyl group equivalent of 1.8 (70.0 g) was dissolved in 500 mL of chloroform. To the solution was added 13.3 g of 3-isocyanatopropyltriethoxysilane, heated with refluxing for 10 hours, and cooled to room temperature. The reaction mixture was dropwise added to 7 L of methanol to precipitate the reaction product. The precipitated substance was filtered off, washed with methanol, and dried in vacuo (97% yield).

hu 1H-NMR spectrum shows that the reaction product is the triethoxysilyl end-capped polycarbonate (PCS) in which alkoxysilyl groups are introduced at the both ends. The alkoxysilyl group equivalent of the product was 1.8. The number average molecular weight of the reaction product was determined by GPC measurement as 4400.

Preparation Example 2

Polysulfone diol having a number average molecular weight of 5200, and a hydroxyl group equivalent of 1.7 (26.0 g) was dissolved in 300 mL of chloroform. To the solution was added 3.5 g of 3-isocyanatopropyltriethoxysilane, heated with refluxing for 11 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum shows that the reaction product is the triethoxysilyl end-capped polysulfone (PSS) in which alkoxysilyl groups are introduced at the both ends. The alkoxysilyl group equivalent of the product was 1.7. The number average molecular weight of the reaction product was determined by GPC measurement as 6000.

Preparation Example 3

Polyarylate diol having a number average molecular weight of 6100, and a hydroxyl group equivalent of 1.6 (30.5 g) was dissolved in 300 mL of chloroform. To the solution was added 3.2 g of 3-isocyanatopropyltriethoxysilane, heated with refluxing for 15 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum shows that the reaction product is the triethoxysilyl end-capped polyarylate (PAS) in which alkoxysilyl groups are introduced at the both ends. The alkoxysilyl group equivalent of the product was 1.6. The number average molecular weight of the reaction product was determined by GPC measurement as 6700.

Example 1

0.40 g of PCS having a number average molecular weight of 4400 prepared in Preparation Example 1, and 0.20 g of tetraethoxysilane (TEOS) were dissolved in 10 ml of tetrahydrofuran (THF), to this, 0.10 g of 1N aqueous hydrochloric acid was added, and was stirred by force for 1 hour to obtain modified metal oxide particles dispersed in THF.

On the other hand, 2.00 g of the polycarbonate resin IUPILON available from Mitsubishi Engineering Plastic K.K. was dissolved in 40 ml of dichloromethane, and to this, the modified metal oxide particles dispersion was dropwise added, and was stirred for 1 hour.

The resulting solution was coated on a polyamide substrate (2 mm in thickness) by using a spin coater, and dried to obtain a silica/polycarbonate coated film. In addition, the solution was casted in a tray, a solvent was volatilized to obtain a transparent silica/polycarbonate film.

Example 2

1.00 g of TEOS was dissolved in 10 ml of THF, to this, 0.35 g of 1N aqueous hydrochloric acid was added, and was stirred by force for 10 minutes to obtain metal oxide particles dispersed in THF.

1.00 g of PCS having a number average molecular weight of 4400 prepared in Preparation Example 1 was dissolved in 20 ml of THF, to this, the metal oxide particles dispersion was dropwise added, 0.05 g of 1N-aqueous hydrochloric acid was added, and was stirred by force for 1 hour to obtain modified metal oxide particles dispersed in THF.

2.00 g of a polycarbonate resin having a number average molecular weight of 24000 was dissolved in 40 ml of THF, to this, the modified metal oxide particles dispersion was dropwise added, and was stirred for 1 hour.

The resulting solution was coated on a polyamide substrate (2 mm in thickness) by using a spin coater, and dried to obtain a silica/polycarbonate coated film. In addition, the solution was casted in a tray, a solvent was volatilized to obtain a silica/polycarbonate film.

Example 3

2.00 g of TEOS was dissolved in 20 ml of THF, to this, 0.70 g of 1N aqueous hydrochloric acid was added, and was stirred by force for 10 minutes to obtain metal oxide particles dispersed in THF.

2.00 g of PCS having a number average molecular weight of 4400 prepared in Preparation Example 1 was dissolved in 40 ml of THF, to this, the metal oxide particles dispersion was dropwise added, 0.10 g of 1N-aqueous hydrochloric acid was added, and was stirred by force for 1 hour to obtain modified metal oxide particles dispersed in THF.

2.00 g of a polycarbonate resin having a number average molecular weight of 36000 was dissolved in 40 ml of dichloromethane, to this, the modified metal oxide particles dispersion was dropwise added, and was stirred for 1 hour.

The resulting solution was coated on a polyamide substrate (2 mm in thickness) by using a spin coater, and dried to obtain a silica/polycarbonate coated film. In addition, the solution was casted in a tray, a solvent was volatilized to obtain a silica/polycarbonate film.

Example 4

0.40 g of PSS having a number average molecular weight of 6000 prepared in Preparation Example 2, and 0.20 g of tetramethoxysilane oligomer MKC SILICATE MS-56 available from Mitsubishi Kagaku K.K. (TMOS) were dissolved in 10 ml of THF, to this, 0.10 g of 1N aqueous hydrochloric acid was added, and was stirred by force for 1 hour to obtain modified metal oxide particles dispersed in THF.

On the other hand, 2.00 g of a polysulfone resin having a number average molecular weight of 22000 available from Aldrich Co. was dissolved in 40 ml of chloroform, and to this, the modified metal oxide particles dispersion was dropwise added, and was stirred for 1 hour.

The resulting solution was coated on a polyamide substrate (2 mm in thickness) by using a spin coater, and dried to obtain a silica/polysulfone coated film. In addition, the solution was casted in a tray, a solvent was volatilized to obtain a transparent silica/polysulfone film.

Example 5

2.00 g of TMOS was dissolved in 20 ml of THF, to this, 0.72 g of 1N aqueous hydrochloric acid was added, and was stirred by force for 10 minutes to obtain metal oxide particles dispersed in THF.

2.00 g of PSS having a number average molecular weight of 6000 prepared in Preparation Example 2 was dissolved in 40 ml of THF, to this, the metal oxide particles dispersion was dropwise added, 0.07 g of 1N-aqueous hydrochloric acid was added, and was stirred by force for 1 hour to obtain modified metal oxide particles dispersed in THF.

2.00 g of a polysulfone resin having a number average molecular weight of 22000 was dissolved in 40 ml of chloroform, to this, the modified metal oxide particles dispersion was dropwise added, and was stirred for 1 hour.

The resulting solution was coated on a polyamide substrate (2 mm in thickness) by using a spin coater, and dried to obtain a silica/polysulfone coated film. In addition, the solution was casted in a tray, a solvent was volatilized to obtain a silica/polysulfone film.

Example 6

0.40 g of PAS having a number average molecular weight of 6700 prepared in Preparation Example 3, and 0.20 g of TMOS were dissolved in 10 ml of THF, to this, 0.10 g of 1N aqueous hydrochloric acid was added, and was stirred by force for 1 hour to obtain modified metal oxide particles dispersed in THF.

On the other hand, 2.00 g of the polyarylate resin U-POLYMER available from Unitika K.K. was dissolved in 40 ml of dichloromethane, and to this, the modified metal oxide particles dispersion was dropwise added, and was stirred for 1 hour.

The resulting solution was coated on a polyamide substrate (2 mm in thickness) by using a spin coater, and dried to obtain a silica/polyarylate coated film. In addition, the solution was casted in a tray, a solvent was volatilized to obtain a transparent silica/polyarylate film.

Example 7

2.00 g of TMOS was dissolved in 20 ml of THF, to this, 0.72 g of 1N aqueous hydrochloric acid was added, and was stirred by force for 10 minutes to obtain metal oxide particles dispersed in THF.

2.00 g of PAS having a number average molecular weight of 6700 prepared in Preparation Example 3 was dissolved in 40 ml of THF, to this, the metal oxide particles dispersion was dropwise added, 0.06 g of 1N-aqueous hydrochloric acid was added, and was stirred by force for 1 hour to obtain modified metal oxide particles dispersed in THF.

2.00 g of the polyarylate resin U-POLYMER available from Unitika Co. Ltd. was dissolved in 40 ml of dichloromethane, to this, the modified metal oxide particles dispersion was dropwise added, and was stirred for 1 hour.

The resulting solution was coated on a polyamide substrate (2 mm in thickness) by using a spin coater, and dried to obtain a silica/polyarylate coated film. In addition, the solution was casted in a tray, a solvent was volatilized to obtain a silica/polyarylate film.

Example 8

A mixture of 15.0 g of PCS having a number average molecular weight of 4400 prepared in Preparation Example 1, and 15.0 g of TEOS was introduced in the BRABENDER HBI SYSTEM TYPE 90 manufactured by Haacke Co., and was mixed at 200° C. for 10 minutes. 20.0 g of a polycarbonate resin having a number average molecular weight of 36000 was added to the BRABENDER, and was further mixed at 280° C. for 10 minutes to obtain a silica/polycarbonate composite material.

Example 9

A mixture of 15.0 g of PSS having a number average molecular weight of 6000 prepared in Preparation Example 2, and 15.0 g of TMOS was introduced in the BRABENDER HBI SYSTEM TYPE 90 manufactured by Haacke Co., and was mixed at 200° C. for 10 minutes. 20.0 g of a polysulfone resin having a number average molecular weight of 22000 was added to the BRABENDER, and was further mixed at 330° C. for 10 minutes to obtain a silica/polysulfone composite material.

Example 10

1.1 g of PCS having a number average molecular weight of 4400 prepared in Preparation Example 1, 3.0 g of fumed silica available from Aldrich Co., and 100 mL of toluene were placed in a 200 mL flask, and were mixed with refluxing for 24 hours. Thereafter, toluene was distilled out to obtain 4.2 g of white substance. 3.0 g of a polycarbonate resin having a number average molecular weight of 24000 was dissolved in 60 mL of dichloromethane, to this, 0.2 g of the white substance was added, and was stirred for 30 minutes.

The resulting solution was coated on a polyamide substrate (2 mm in thickness) by using a spin coater, and dried to obtain a silica/polycarbonate coated film. In addition, the solution was casted in a tray, a solvent was volatilized to obtain a silica/polycarbonate film.

Example 11

1.1 g of PCS having a number average molecular weight of 4400 prepared in Preparation Example 1, 4.0 g of titanium oxide super fine particles ST-300 (not more than 0.05 μm in particle size), and 100 mL of toluene were placed in a 200 mL flask, and were mixed with refluxing for 24 hours. Thereafter, toluene was distilled out to obtain 5.1 g of white substance. 3.0 g of a polycarbonate resin having a number average molecular weight of 24000 was dissolved in 60 mL of dichloromethane, to this, 0.2 g of the white substance was added, and was stirred for 30 minutes.

The resulting solution was coated on a polyamide substrate (2 mm in thickness) by using a spin coater, and dried to obtain a titania/polycarbonate coated film. In addition, the solution was casted in a tray, a solvent was volatilized to obtain a titania/polycarbonate film.

Example 12

A mixture of 11.0 g of PCS having a number average molecular weight of 4400 prepared in Preparation Example 1, and 30.0 g of fumed silica available from Aldrich Co. was introduced in the BRABENDER HBI SYSTEM TYPE 90 manufactured by Haacke Co., and was mixed at 200° C. for 10 minutes to obtain 40.5 g of white substance. 2.7 g of the white substance and 40.0 g of a polycarbonate resin having a number average molecular weight of 24000 were introduced again to the BRABENDER, and were mixed at 280° C. for 10 minutes to obtain a silica/polycarbonate composite material.

Example 13

A mixture of 11.0 g of PCS having a number average molecular weight of 4400 prepared in Preparation Example 1, and 40.0 g of titanium oxide super fine particles ST-300 (not more than 0.05 μm in particle size), and was mixed at 200° C. for 10 minutes to obtain 50.6 g of white substance. 2.7 g of the white substance and 40.0 g of a polycarbonate resin having a number average molecular weight of 24000 were introduced again to the BRABENDER, and were mixed at 280° C. for 10 minutes to obtain a titania/polycarbonate composite material.

Example 14

3.0 g of the white substance prepared from PCS and silica in Example 10, and 40.0 g of a polycarbonate resin having a number average molecular weight of 36000 were introduced again to the BRABENDER HBI SYSTEM TYPE 90 manufactured by Haacke Co., and were mixed at 280° C. for 10minutes to obtain a silica/polycarbonate composite material.

Example 15

3.0 g of the white substance prepared from PCS and titanium oxide in Example 11, and 40.0 g of a polycarbonate resin having a number average molecular weight of 36000 were introduced to the BRABENDER HBI SYSTEM TYPE 90 manufactured by Haacke Co., and were mixed at 280° C. for 10 minutes to obtain a titania/polycarbonate composite material.

Comparative Example 1

1.00 g of TEOS was dissolved in 10 ml of THF, to this, 0.35 g of 1N aqueous hydrochloric acid was added, and was stirred by force for 10 minutes to obtain metal oxide particles dispersed in THF.

2.00 g of a polycarbonate resin having an average molecular weight of 36000 was dissolved in 40 ml of THF, to this, the metal oxide particles dispersion was dropwise added, and was stirred for 1 hour.

The resulting solution was casted in a tray, a solvent was volatilized to obtain a silica/polycarbonate film. The film had white appearance and was fragile.

Comparative Example 2

1.00 g of TMOS was dissolved in 10 ml of THF, to this, 0.36 g of 1N aqueous hydrochloric acid was added, and was stirred by force for 10 minutes to obtain metal oxide particles dispersed in THF.

2.00 g of a polysulfone resin having an average molecular weight of 22000 was dissolved in 40 ml of chloroform, to this, the metal oxide particles dispersion was dropwise added, and was stirred for 1 hour.

The resulting solution was casted in a tray, a solvent was volatilized to obtain a silica/polysulfone film. The film had white appearance and was fragile.

Comparative Example 3

1.00 g of TMOS was dissolved in 10 ml of THF, to this, 0.36 g of 1N aqueous hydrochloric acid was added, and was stirred by force for 10 minutes to obtain metal oxide particles dispersed in THF.

2.00 g of the polyarylate resin U-POLYMER available from Unitika Co. Ltd. was dissolved in 40 ml of dichloromethane, to this, the metal oxide particles dispersion was dropwise added, and was stirred for 1 hour.

The resulting solution was casted in a tray, a solvent was volatilized to obtain a silica/polyarylate film. The film had white appearance and was fragile.

Scanning Electron Microscope (SEM) Observation

Cross sections of the films prepared in Examples 1 to 7, and Comparative Examples 1 to 3 were observed by using the "JSM-5800 LVC" type scanning electron microscope manufactured by JEOL K.K.

As to the silica/polycarbonate film prepared in Comparative Examples 1 to 3, the gappy internal structure which has a lot of pores of from a few μm to not less than 10 μm accompanied by the macroscopic phase separation between the silica component and the organic polymer component, was observed.

On the other hand, as to the silica/polycarbonate films of the present invention prepared in Examples 1 to 3, the silica/polysulfone films of Examples 4 and 5, and the silica/polyarylate films of Examples 6 and 7, the homogeneous internal structure having no macroscopic phase separation, was observed.

Figure 1:
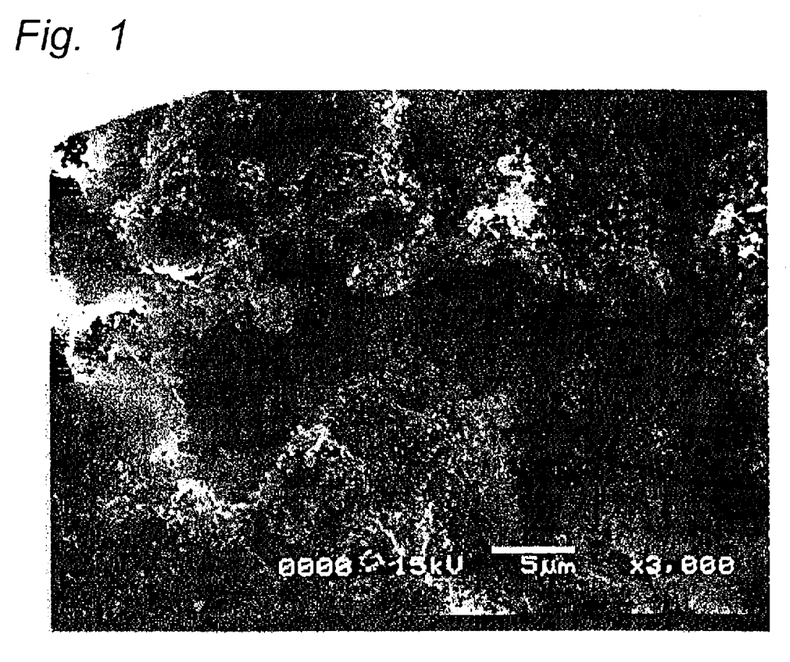
FIG. 1 shows the SEM photograph of the silica/polycarbonate film of Comparative Example 1.
Figure 2:
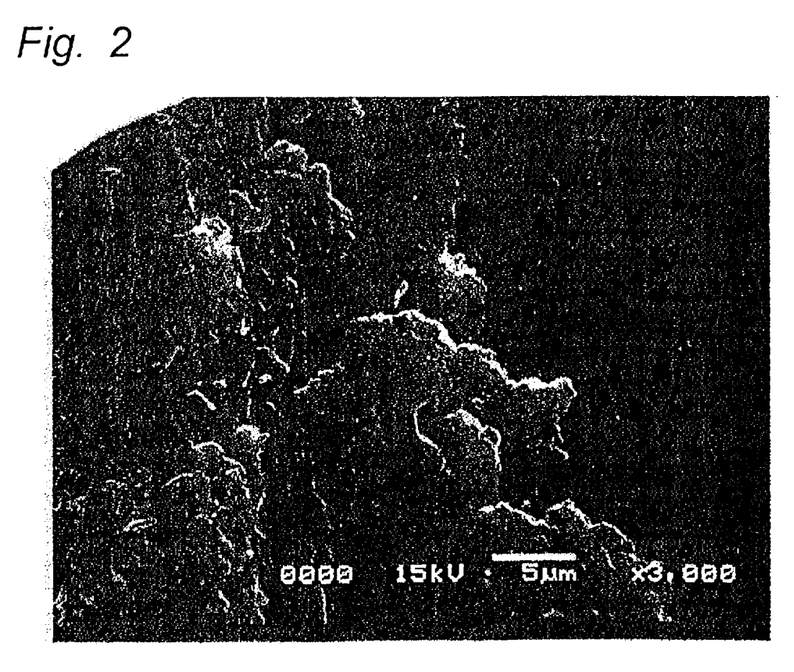
FIG. 2 shows the SEM photograph of the silica/polycarbonate film of Example 2.

FIG. 1 shows the SEM photograph of the silica/polycarbonate film of Comparative Example 1, and FIG. 2 shows the SEM photograph of the silica/polycarbonate film of Example 2.

The plainer elemental analysis of Si element was conducted on the films of Examples 1 to 7, as a result, all the films had homogeneous distribution of Si element.

The results show that the metal oxide is dispersed finely and uniformly in the organic-inorganic composite material of the present invention.

Surface Hardness Measurement

The surface hardness by pencil hardness of the films formed on the polyamide substrates in Examples 1 to 7, 10 and 11 was measured. Prior to the measurement, the coated films were heated at 120° C. for 6 hours, left to stand for 48 hours in the constant room at 23° C. and 50% humidity.

As a measuring apparatus, PEELING/SLIPPING/SCRATCHING TESTER MODEL HEIDON-14 manufactured by HEIDON Co. and MITSUBISHI UNI pencil manufactured by Mitsubishi Pencil K.K. were used. The measurement was conducted with reference to JIS K 5400 pencil scratching test on the condition that the platform moving rate was 30 mm/min, and the load was 1.00 kg. The results are shown in Table 1.

TABLE 1

Surface Hardness

| Sample | Film Thickness ($\mu$m) | Pencil Hardness |
|---|---|---|
| Polycarbonate | 5 | HB |
| Example 1 | 5 | 2H |
| Example 2 | 4 | 2H |
| Example 3 | 5 | 3H |
| Example 10 | 5 | 2H |
| Example 11 | 4 | 3H |
| Polysulfone | 5 | F |
| Example 4 | 5 | 2H |
| Example 5 | 5 | 3H |
| Polyarylate | 4 | F |
| Example 6 | 4 | 2H |
| Example 7 | 5 | 3H |

The pencil hardness of the silica/polycarbonate film of the present invention is remarkably increased by comparison with the commercially available polycarbonate film. The results similar to above were obtained on the silica/polysulfone film, and the silica/polyarylate film. The results show that the surface hardness of the organic-inorganic composite material of the present invention was excellent.

Tensile Strength Test

The silica/polycarbonate composite material prepared in Example 8, and the silica/polysulfone composite material prepared in Example 9, were molded to test pieces with dumbbell shape (20 mm in length, 5 mm in radius) by using a compact injection molding machine at a temperature of 280 to 350° C. A polycarbonate resin, and a polysulfone resin, commercially available, were employed as the comparative examples, and also molded to test pieces as described above. The test pieces were left to stand for 48 hours in the constant room at 23° C. and 50% humidity, and tested.

The test was conducted with reference to JIS K 7113 and 7127 by using the AUTOGRAPH DSS 5000 manufactured by Shimazu Seisakusyo K.K. with the load cell of 100 kgf, at a test speed of 10 mm/min. The results were shown in Table 2.

TABLE 2

Tensile Strength Test

| Sample | Yield strength ($10^6$Pa) | Breaking elongation (%) | Tensile elastic modulus ($10^6$Pa) |
|---|---|---|---|
| Polycarbonate | 54 | 63 | 1730 |
| Example 8 | 82 | 7 | 2720 |
| Polysulfone | 65 | 52 | 2360 |
| Example 9 | 88 | 5 | 2910 |

The silica/polycarbonate composite material of the present invention shows improved tensile yield strength, and tensile elastic modulus, whereas poor breaking elongation, by comparison with the sample prepared from a commercially available polycarbonate resin. The results similar to above were obtained on the silica/polysulfone film, and the silica/polyarylate film. The results show that the mechanical strength of the organic-inorganic composite material of the present invention is excellent.

Izod Impact Test

The silica/polycarbonate composite material prepared in Example 8 was molded to test pieces having notch (20 mm in length, 5 mm in thickness) by using a compact injection molding machine at a temperature of 280 to 300° C. A non-reinforced polycarbonate resin, and a reinforced polycarbonate resin filled with 30% by weight of glass fiber, commercially available, were employed as the comparative examples, and also molded to test pieces as described above.

The test pieces were left to stand for 48 hours in a constant room at 23° C. and 50% humidity, and tested. The test was conducted with reference to JIS K 7110 by using an impact testing machine manufactured by Toyo Seiki K.K. The results were shown in Table 3.

TABLE 3

Izod Impact Test

| Sample | Impact strength ($10^4$ J/cm) |
|---|---|
| Polycarbonate (not reinforced) | 6.5 |
| Reinforced polycarbonate | 1.0 |
| Example 8 | 4.1 |

The impact strength of the silica/polycarbonate composite material of the present invention was not so good as the non-reinforced polycarbonate resin, but better than the reinforced polycarbonate resin. The results show that the particle size of the silica dispersed in the silica/polycarbonate composite material of the present invention is considerably smaller than that of the glass fiber dispersed in the reinforced polycarbonate resin filled with glass fiber.

What is claimed is:

1. An organic-inorganic composite material which comprises a matrix of an organic polymer (E) which has a backbone composed of polycarbonate, polyarylate, or polysulfone; metal oxide particles (C) dispersed uniformly in the organic polymer (E); and a surface modifier for allowing the metal oxide particles (C) to disperse uniformly in the organic polymer (E), wherein the surface modifier is derived from an organic polymer (A) which has a metal alkoxide group and a backbone of the same kind as the organic polymer (E), and, in the surface modifier, a backbone of the organic polymer (A) being bonded covalently to the metal oxide particles as a result of a condensation reaction between the metal alkoxide group and the metal oxide particle.

2. The organic-inorganic composite material according to claim 1, wherein the organic polymer (E) has a number average molecular weight of from 1000 to 100000.

3. The organic-inorganic composite material according to claim 1, wherein the metal oxide particles (C) are prepared by the hydrolysis and the polycondensation reaction of a metal alkoxide compound or the low-condensate thereof.

4. The organic-inorganic composite material according to claim 1, wherein metal element of the metal oxide particles (C) is at least one selected from the group consisting of Si, Ti, and Zr.

5. The organic-inorganic composite material according to claim 1, wherein an average particle size of the metal oxide particles (C) is from 0.001 to 1 $\mu$m.

6. The organic-inorganic composite material according to claim 1, wherein metal element of the metal alkoxide group is at least one selected from the group consisting of Si, Ti, and Zr.

7. The organic-inorganic composite material according to claim 1, wherein the organic polymer (A) has a number average molecular weight of from 500 to 50000.

8. A process for preparing the organic-inorganic composite material of claim 1, comprising the steps of:

(1) obtaining metal oxide particles coated with a surface modifier;

(2) dispersing the metal oxide particles coated with the surface modifier uniformly in an organic polymer (E) which has a backbone composed of polycarbonate, polyarylate, or polysulfone; and (3) setting the resulting mixture, wherein the surface modifier is derived from an organic polymer (A) which has a metal alkoxide group and a backbone of the same kind as the organic polymer (E), and, in the surface modifier, a backbone of the organic polymer (A) being bonded covalently to the metal oxide particles as a result of a condensation reaction between the metal alkoxide group and the metal oxide particle.

* * * * *